R. F. VENNER.
ILLUMINATED SIGN.
APPLICATION FILED OCT. 1, 1909.

955,926.

Patented Apr. 26, 1910.

Witnesses,

Inventor,
R. F. Venner

UNITED STATES PATENT OFFICE.

ROBERT FRANCIS VENNER, OF ADDISCOMBE, ENGLAND.

ILLUMINATED SIGN.

955,926.  Specification of Letters Patent.  Patented Apr. 26, 1910.

Application filed October 1, 1909. Serial No. 520,569.

*To all whom it may concern:*

Be it known that I, ROBERT FRANCIS VENNER, a subject of the King of England, residing at Addiscombe, in the county of Surrey, in the Kingdom of England, have invented a new and useful Improvement in Illuminated Signs, of which the following is a specification.

The object of this invention is to provide means for securing imperforate transparent balls or beads *i. e.* spherical bodies in a single perforated plate forming the front of an illuminated sign, and for this purpose I adopt either plain glass balls, grooved balls, or balls having diametral notches or indentations.

I attain my object by the means shown in the annexed drawings, in which:—

Figure 1:
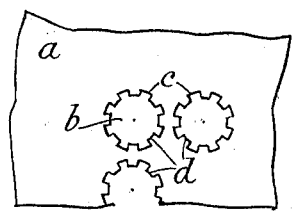
Figure 2:
Figure 3:
Figure 5:
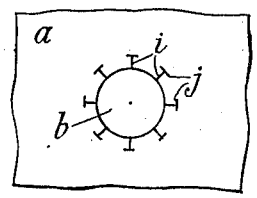
Figure 4:
Figure 6:

Figure 1 is a face-view of a portion of a plate formed with serrated holes; Fig. 2 is a cross-section showing a plain glass ball engaged between the serrated parts of the plate; Fig. 3 is a cross-section showing the serrations sprung in a grooved ball; Fig. 4 is a ball having flanges for engagement with the serrated hole; Fig. 5 is a face view of a portion of plate having a hole with cross-slits; Fig. 6 shows a ball formed with spiral groove.

In all the figures the same reference characters denote similar parts.

The plate $a$ is suitably perforated or stamped with holes $b$ formed with radial slots $c$ so as to leave a plurality of teeth $d$ around the inner edge, said teeth being alternately bent in and out as shown at Fig. 2. Illuminating balls $e$ of appropriate size are pressed into the holes and retained by the teeth $d$. However, the serrated edges may be left straight and a grooved glass ball $f$ is then pressed in the hole so as to cause the teeth $d$ to engage in said groove. This can be easily accomplished by shifting the groove to one side of the perimeter of the ball and then forcing the small cap or calotte of the latter through the hole. Or the groove $g$ may be formed by the provision of small flanges $h$.

Instead of serrated holes radial slits $i$ may be made in the edge of holes $b$ and short cross-slits $j$ at the end of the said radial slits $i$ will impart the necessary springiness to enable grooved balls to be pressed into the holes and retained therein. Or the balls may have a spiral groove $k$ so as to allow of being screwed into the holes $b$.

I claim:

1. An illuminated sign comprising a single perforated plate, the edges of said perforations being yielding, and illuminating balls sprung within and held by said yielding edges.

2. An illuminated sign, comprising a single perforated plate, the edges of the perforations thereof being radially slit to render said edges yielding, and illuminating balls sprung into and held by said yielding edges.

ROBERT FRANCIS VENNER.

Witnesses:
 Jos. CHATWIN,
 E. MEAD.